United States Patent [19]
Bell

[11] 3,814,124
[45] June 4, 1974

[54] THERMOPLASTIC CHECK VALVE

[75] Inventor: Richard W. Bell, Brossard, Quebec, Canada

[73] Assignee: Esso Research and Engineering Company, Linden, N.J.

[22] Filed: Sept. 20, 1972

[21] Appl. No.: 290,652

[52] U.S. Cl. .......................... 137/525.3, 137/454.2
[51] Int. Cl. ...................... F16k 15/03, F16k 15/16
[58] Field of Search.......... 137/525.3, 525.5, 525.7, 137/527, 527.2, 527.4, 527.6, 527.8, 515.5, 515.7, 454.2, 454.4, 454.6

[56] References Cited
UNITED STATES PATENTS

| | | | |
|---|---|---|---|
| 1,720,444 | 7/1929 | Rowley | 137/527.8 |
| 2,378,613 | 6/1945 | Young et al. | 137/525.3 |
| 2,882,923 | 4/1959 | Smolensky | 137/527.8 X |
| 2,930,400 | 3/1960 | Wheatley | 137/527.8 |
| 3,128,785 | 4/1964 | Krummel | 137/525.3 X |
| 3,191,619 | 6/1965 | Allen | 137/527.4 |
| 2,378,613 | 6/1945 | Young et al. | 137/525.3 |
| 3,292,658 | 12/1966 | Scaramocci | 137/535.3 |

Primary Examiner—William R. Cline
Attorney, Agent, or Firm—J. J. Dvorak

[57] ABSTRACT

A valve element is provided for converting a section of plastic pipe, particularly increaser bushings and cleanout T's, into an effective check valve. The valve element has a ring, cover and flexible web integral with the cover. The outside diameter of the ring is sufficient to permit a snug fit of the ring with the attached cover in the pipe section thereby converting the pipe section to a check valve.

4 Claims, 2 Drawing Figures

PATENTED JUN 4 1974 3,814,124

THERMOPLASTIC CHECK VALVE

BACKGROUND OF THE INVENTION

1. Field of the Invention

The present invention relates to valves generally known in the art as flapper, clapper or swinging type valves. More particularly, the present invention relates to a novel valve element adapted for inserting in a section of plastic pipe whereby the pipe is converted to a check valve.

2. Description of the Prior Art

Numerous types of check valves are provided in the art to permit fluid flow in one direction through pipes and prevent the flow of fluids in the reverse direction through the pipes. Most of the check valves devised, however, employ relatively complicated housings, seat and valve member constructions, and are relatively expensive to manufacture. Furthermore, such check valves generally are constructed from metal such as cast iron which require special fittings if the valve is to be installed in a plastic pipe system used more frequently in a wide range of industries including the construction industry. Thus, for example, if it is desired to install a backwater or check valve in a plastic drain waste and vent system, present practice requires the installation of various adapters in order to install the cast iron backwater check valve in the plastic pipe system. Consequently, there is a need for a valve element that can be readily inserted into a section of plastic pipe system which can be economically manufactured and which overcomes some of the problems in the prior art constructions.

SUMMARY OF THE INVENTION

According to the present invention, a novel valve element is provided which is adapted for insertion in a section of plastic pipe thereby converting the plastic pipe into an effective check valve. The valve element in its simplest sense comprises a ring, a cover and a flexible web integral with the ring and cover. The ring has an outside diameter sufficient to permit the ring to fit snugly within a section of a tubular pipe system. The cover has a diameter sufficiently large to cover the inner diameter of the ring when closed but sufficiently small that when taken together with the integral web, the web will not extend beyond the outer diameter of the ring.

As already indicated, the present invention contemplates inserting the valve element in a section of plastic pipe. Preferably, the section of plastic pipe in which the valve element is inserted is an increaser bushing or cleanout T. Thus, one embodiment of the present invention contemplates a plastic check valve comprising in combination with a section of a plastic pipe system selected from the increaser bushings and cleanout T's, a plastic valve element adapted for insertion in the pipe section, the valve element consisting essentially of a ring, cover and flexible web.

DETAILED DESCRIPTION

Figure 1:
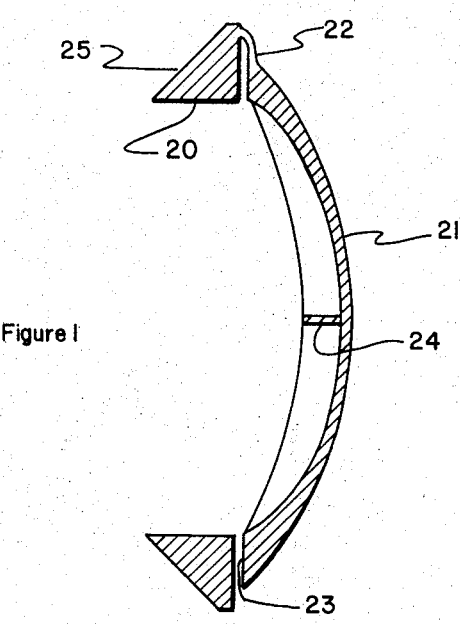
FIG. 1 is a cross-sectional view of the valve element of this invention.

Referring to the drawings and especially FIG. 1, it can be seen that the valve element consists of a ring 20, a cover 21 and a flexible web 22 integral with ring 20 and cover 21. Ring 20 has a diameter sufficient that it will fit snugly within a section of a tubular pipe system. Cover 21 has a diameter which is larger than the inner diameter of ring 20 to provide a marginal sealing face 23; however, the diameter of cover 21 is sufficiently small so that cover 21 together with flexible web 22 does not extend beyond the outer diameter of ring 20.

Preferably, cover 21 is convex and optionally is provided with radially disposed supporting or strengthening ribs 24.

Since it is particularly intended that the valve element of the present invention be inserted in a section of plastic pipe such as in a cleanout T or increaser bushing, ring 20 is provided with a beveled edge 25 for seating with a mating surface in the pipe section.

Intermediate web 22 is sufficiently flexible or resilient to permit cover 21 to swing open and closed in response to the flow of fluids through a system incorporating the valve element.

Figure 2:
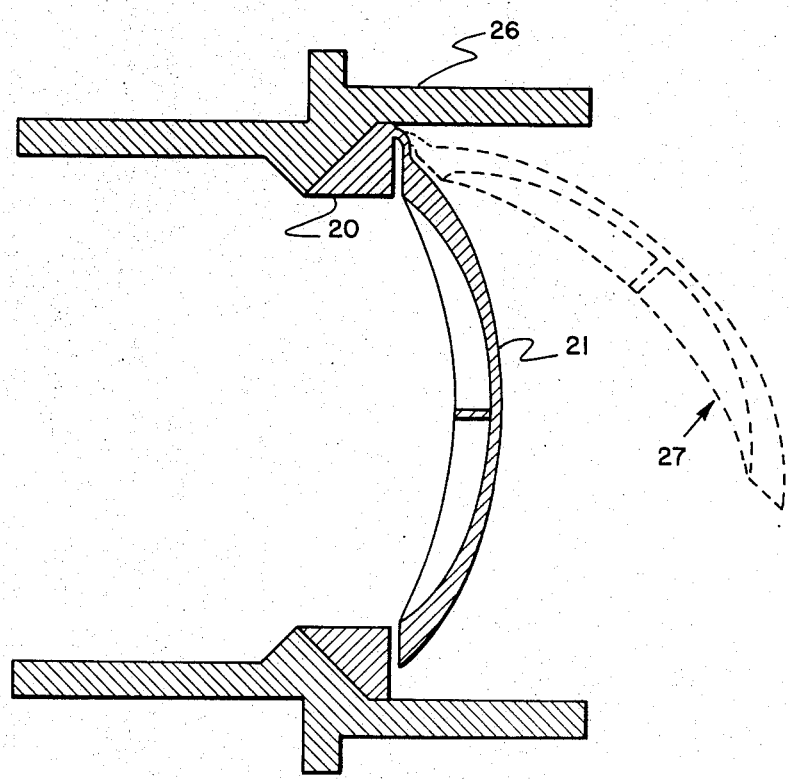
FIG. 2 is a cross-sectional view of the valve element inserted in the plastic increaser bushing.

As shown in FIG. 2, the valve element is adapted to be inserted inside a section of pipe such as an increaser bushing. Preferably, the valve element is inserted in the increaser bushing or a cleanout T which has an inner diameter at a first end which is larger than the inner diameter at the second end on upstream end of the pipe system. When used in this manner as the valve opens, the opening will have an area equal to or greater than the opening of the smaller upstream pipe.

Also shown in FIG. 2 by the dotted portion designated 27 is the valve element when the cover 21 is in an open position.

As indicated, the valve element of this invention is made of moldable plastic material typically employed in plastic pipe systems. Generally, such polymeric materials include polyvinylchloride, polyacrylonitrile, polybutadiene co-polymers and terpolymers of these materials. In a preferred embodiment of this invention the plastic valve element is made of polypropylene.

Utilizing the present invention, the valve element is inserted in a section of pipe and sealed thereto. The sealing can be accomplished in any generally accepted manner. For example, the interior of the pipe and ring 20 are cleaned; then the mating surfaces are coated with an adhesive or solvent welding compound and thereafter the ring is pressed in the pipe section until fully inserted. As soon as the solvent evaporates or the adhesive dries, the valve element is permanently secured within the pipe section.

What is claimed is:

1. A valve element adapted for insertion within a section of tubular plastic pipe, said valve element comprising: a ring; a cover; a flexible web integral with said ring and cover; said ring having a diameter such that it will fit snugly within the section of tubular plastic pipe, said ring having a sealing surface adapted to mate with a corresponding surface in said section of tubular plastic pipe; said cover having an outer diameter less than the outer diameter of the ring whereby the cover can swing open and closed by means of the flexible web, said cover having a marginal sealing surface sufficiently resilient to effect a liquid seal when urged against said ring; and, said flexible web integral with said ring and cover being sufficiently resilient to permit said cover to swing open and closed in response to the flow of fluids through said pipe system incorporating said valve element.

2. The valve of claim 1 wherein the cover has a convex shape.

3. The valve element of claim 2 wherein said cover has radially disposed supporting ribs.

4. A plastic check valve comprising in combination a tubular plastic increaser bushing and a valve element adapted for insertion in said increaser bushing; said increaser bushing having a first end and a second end, the inner diameter of said first end being larger than the inner diameter of said second end, said inner wall of said increaser bushing beveled to the point where the diameter changes from said first end to said second end; said valve element having a ring, cover flexible web integral with said ring and cover, said ring being adapted to fit snugly within the first end of said increaser bushing, said ring having a sealing surface adapted to mate with the internal beveled edge of said increaser bushing, and said cover having a diameter less than the outer diameter of said ring so that said cover can swing open between an open position and a closed position by means of said flexible web which is sufficiently resilient to permit said cover to swing open and closed in response to the flow of fluids through said check valve and whereby the area of the opening when said cover is in the open position is at least equal to the area of the opening in the second section of pipe in which said ring is inserted.

* * * * *